(12) United States Patent
Wenthen

(10) Patent No.: US 11,780,329 B2
(45) Date of Patent: Oct. 10, 2023

(54) POWER TRANSFER ASSEMBLY WITH SELF-LOCKING WORM AND SPUR GEARS

(71) Applicant: MAGNA POWERTRAIN OF AMERICA, INC., Troy, MI (US)

(72) Inventor: David Wenthen, Rochester Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 0 days.

(21) Appl. No.: 17/627,893

(22) PCT Filed: Jul. 22, 2020

(86) PCT No.: PCT/US2020/042997
§ 371 (c)(1),
(2) Date: Jan. 18, 2022

(87) PCT Pub. No.: WO2021/025860
PCT Pub. Date: Feb. 11, 2021

(65) Prior Publication Data
US 2022/0250470 A1   Aug. 11, 2022

Related U.S. Application Data

(60) Provisional application No. 62/882,829, filed on Aug. 5, 2019.

(51) Int. Cl.
*F16H 55/22* (2006.01)
*B60K 17/346* (2006.01)
(Continued)

(52) U.S. Cl.
CPC ...... *B60K 17/3467* (2013.01); *B60K 23/0808* (2013.01); *F16D 28/00* (2013.01);
(Continued)

(58) Field of Classification Search
CPC ............ B60K 17/3467; B60K 23/0808; B60K 17/344; F16D 28/00; F16D 2023/123;
(Continued)

(56) References Cited

U.S. PATENT DOCUMENTS

2006/0011001 A1* 1/2006 Showalter ............. F16H 63/304
74/23
2009/0309057 A1   12/2009 Liccardi
(Continued)

FOREIGN PATENT DOCUMENTS

CN      104179937 A  * 12/2014  ............. F16H 55/22
DE      19518194 A1  * 11/1996  ............... F16H 1/16
(Continued)

*Primary Examiner* — Justin Holmes
(74) *Attorney, Agent, or Firm* — Dickinson Wright PLLC

(57) ABSTRACT

A power transfer assembly for a vehicle including an input shaft, at least one output shaft, and at least one clutch configured to perform at least one of changing a gear ratio between the input shaft and the output shaft, and coupling the input shaft with a second output shaft of the at least one output shaft. An actuator assembly is configured to activate the at least one clutch. The actuator assembly has a motor with an output drive, a worm gear coupled with the output shaft, and a spur gear meshed with the worm gear and coupled with the at least one clutch for activating the at least one clutch. The worm gear and the spur gear have opposite gear hands.

15 Claims, 12 Drawing Sheets

(51) Int. Cl.
  *B60K 23/08* (2006.01)
  *F16D 28/00* (2006.01)
  *F16H 3/54* (2006.01)
  *F16H 63/18* (2006.01)
  *F16H 63/32* (2006.01)
  *F16D 23/12* (2006.01)
  *F16H 61/28* (2006.01)

(52) U.S. Cl.
  CPC ............... *F16H 3/54* (2013.01); *F16H 55/22* (2013.01); *F16H 63/18* (2013.01); *F16H 63/32* (2013.01); *F16D 2023/123* (2013.01); *F16H 2061/2892* (2013.01); *F16H 2200/0034* (2013.01)

(58) Field of Classification Search
  CPC .......... F16D 13/648; F16H 3/54; F16H 55/22; F16H 63/18; F16H 63/32; F16H 2061/2892; F16H 2200/0034; F16H 61/28; F16H 1/16
  See application file for complete search history.

(56) References Cited

U.S. PATENT DOCUMENTS

2010/0089199 A1    4/2010   Lafer et al.
2013/0190955 A1*  7/2013   Halwes .................... B60K 6/36
                                                            475/5

FOREIGN PATENT DOCUMENTS

DE          19835121 A1 *  2/2000  ........... B62D 5/0409
JP          2010126100 A    6/2010

* cited by examiner

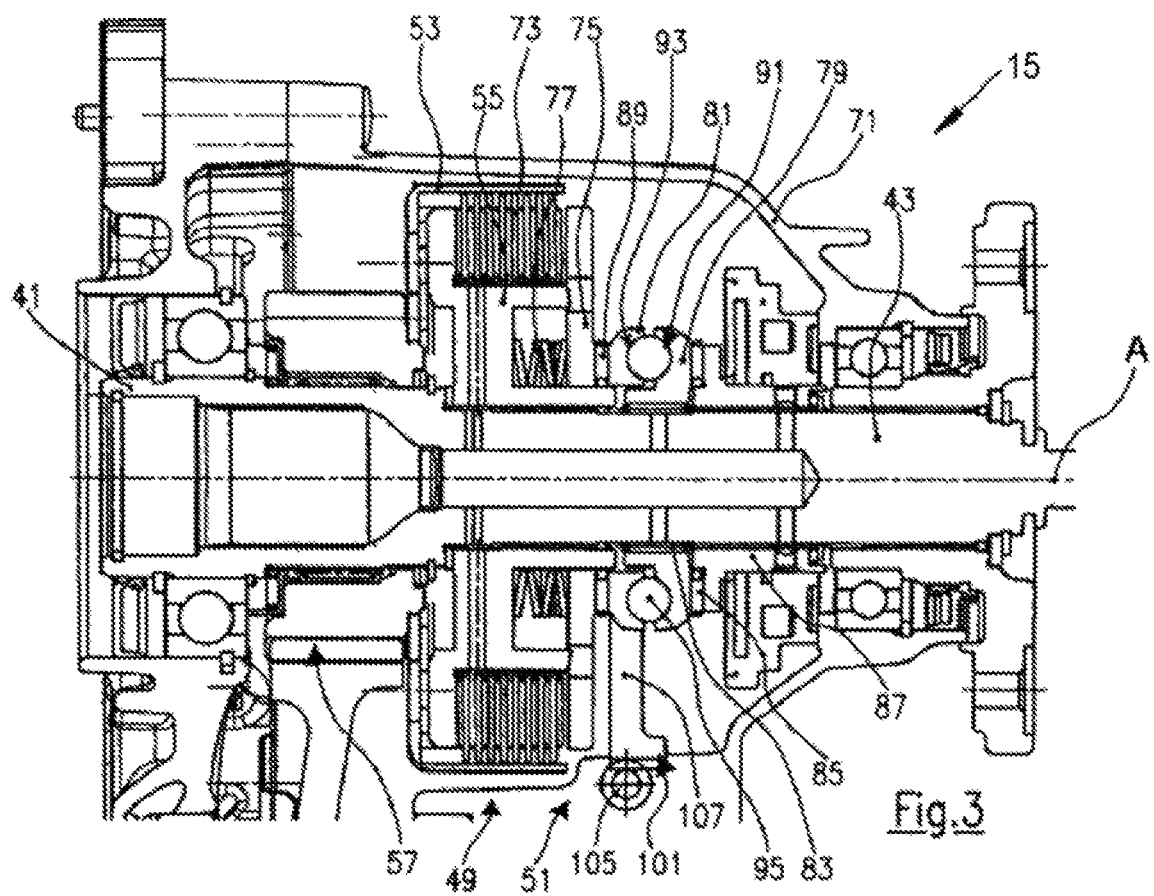

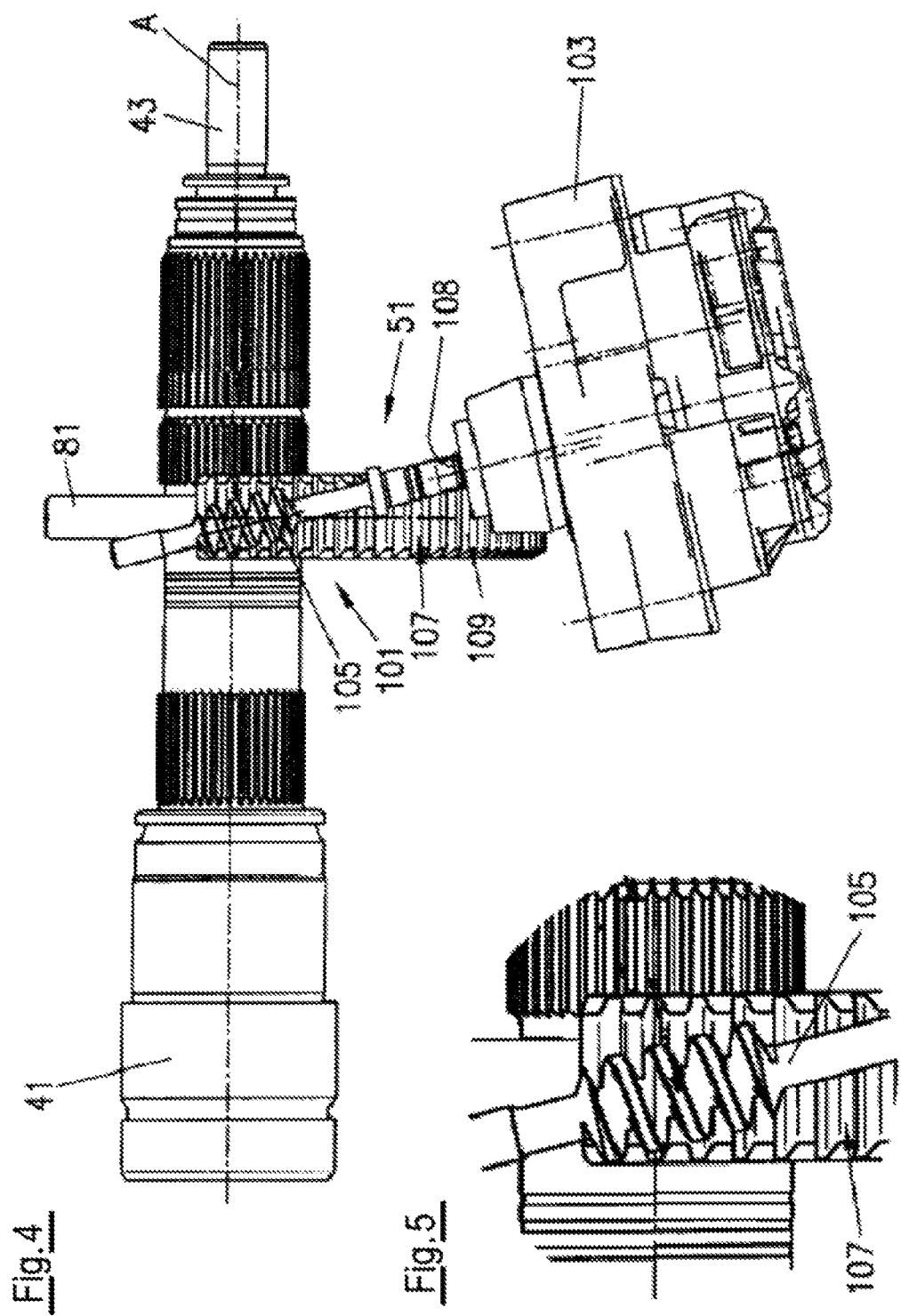

POWER TRANSFER ASSEMBLY WITH SELF-LOCKING WORM AND SPUR GEARS

CROSS-REFERENCE TO RELATED APPLICATIONS

This application is a U.S. National Stage of PCT International Patent Application No. PCT/US2020/042997, filed on Jul. 22, 2020, which claims the benefit and priority to U.S. Provisional Patent Application Ser. No. 62/882,829, filed on Aug. 5, 2019, the entire disclosure of which is incorporated herein by reference.

FIELD

The present disclosure relates generally to power transfer assemblies. More particularly, the present disclosure relates to a power transfer assembly for a vehicle including an actuator assembly having a worm gear and a spur gear meshed with one another for activating a clutch, wherein the worm gear and spur gear have opposite hands for providing improved self-locking.

BACKGROUND

This section provides background information related to the present disclosure which is not necessarily prior art.

Actuator assemblies having worm and spur gears are known for actively managing clutch systems in power transfer assemblies, such as transfer cases of vehicles. In a known arrangement, a worm gear is driven by an output drive of a motor and is meshed with a spur gear which is coupled with a clutch system to provide a gear reduction between the output drive of the motor and the clutch system. Brake systems have been developed to prevent inadvertent shifting of such a clutch system when not desired. One such brake system utilizes an electromagnetically actuated brake to lock the clutch system closed in a desired position and to prevent the clutch system from being shifted into other positions. However, such brake systems are often bulky and expensive. Another such brake system utilizes a mechanical shift hold device that selectively inhibits movement of the output drive of the motor. Although such mechanical shift hold devices reduce weight and costs relative to electromagnetically actuated brake systems, they also may create unsafe conditions if the mechanical hold device does not lock properly. In view of the foregoing, improvements to such power transfer assemblies are desired.

SUMMARY

This section provides a general summary of the disclosure and is not intended to be interpreted as a comprehensive listing of its full scope or all of its objects, aspects features and/or advantages.

It is an aspect of the present disclosure to provide a power transfer assembly with a clutch and an actuator assembly for activating the clutch, wherein the actuator assembly includes a locking feature that is simple in design, reliable and inexpensive to manufacture.

It is a further aspect of the present disclosure to provide a power transfer assembly with a clutch and an actuator assembly for activating the clutch, wherein the actuator assembly shifts the clutch quickly and maximizes torque transferred from the worm gear to the spur gear.

It is a further aspect of the present disclosure to provide a power transfer assembly with a clutch and an actuator assembly for activating the clutch, wherein the actuator assembly includes a motor, a worm gear connected to the motor, and a spur gear meshed with the worm gear and connected to the clutch, wherein the spur gear is unable to back-drive the worm gear, and wherein the worm gear and the spur gear provide a sufficient mesh therebetween for quickly shifting the clutch, maximizing torque transferred from the motor to the spur gear, and providing reliable and consistent operation of the power transfer assembly.

In accordance with these and other aspects of the present disclosure, a power transfer assembly for a vehicle is provided. The power transfer assembly includes an input shaft, at least one output shaft, and at least one clutch configured to perform at least one of changing a gear ratio between the input shaft and the at least one output shaft, and coupling the input shaft with a second output shaft of the at least one output shaft. An actuator assembly is configured to activate the at least one clutch. The actuator assembly has a motor with an output drive, a worm gear coupled with the output shaft, and a spur gear meshed with the worm gear and coupled with the at least one clutch for activating the at least one clutch. The worm gear and the spur gear have opposite gear hands.

According to another aspect of the disclosure, another power transfer assembly for a vehicle is provided. The power transfer assembly includes an input shaft, a first output shaft and a second output shaft. A mode clutch is operable in a first mode position to disengage the second output shaft from driven engagement with the first output shaft, and further operable in a second mode position to establish a drive connection between the first output shaft and the second output shaft. An actuator assembly is configured to move the mode clutch between the first and said modes. The actuator assembly has a motor with an output drive and a reduction gear unit coupled with the output drive for providing a gear reduction between the output drive and the mode clutch. The reduction gear unit includes a worm gear connected to the output drive of the motor, and a spur gear meshed with the worm gear and coupled with the mode clutch for moving the mode clutch between the first and second positions in response to rotation of the spur gear. The worm gear and the spur gear have opposite gear hands.

According to another aspect of the disclosure, another power transfer assembly for a vehicle is provided. The power transfer assembly includes an input shaft, a first output shaft and a second output shaft. A range unit is driven at a reduced speed relative to the input shaft. A range clutch is operable in a first range position to establish a drive connection between the input shaft and the first output shaft, and is further operable in a second range position to establish a drive connection between the range clutch and the first output shaft. A mode clutch is operable in a first mode position to disengage the second output shaft from driven engagement with the first output shaft and further operable in a second mode position to establish a drive connection between the first output shaft and the second output shaft. An actuator assembly is configured to move the range clutch between the first and second range positions and to move the mode clutch between the first and second mode positions. The actuator assembly has a drive motor with an output, a reduction gear unit coupled with the output of the drive motor for providing a gear reduction relative to the output of the drive motor, an actuator assembly shaft coupled with the reduction gear unit, a range actuator assembly driven by the actuator assembly shaft for moving the range clutch between its first and second range positions in response to rotation of the actuator assembly shaft, and a mode actuator assembly driven by the actuator assembly shaft for moving the mode clutch between the first and second mode positions. The reduction gear unit includes a worm gear connected to the output of the drive motor and a spur gear meshed with the worm gear and coupled with the actuator assembly shaft for providing rotation of the actuator assembly shaft. The worm gear and the spur gear have opposite gear hands.

In view of the foregoing, utilizing opposite hands of the worm and spur gears allows a reduction of an angle of friction between the worm and spur gears which improves the ability of the worm and spur gears to self-lock, while also providing sufficient meshing to shift the clutch quickly and maximizing torque transferred from the worm gear to the spur gear.

Further areas of applicability will become apparent from the description provided. The description and specific examples in this summary are intended for purposes of illustration only and are not intended to limit the scope of the present disclosure.

DRAWINGS

The drawings described herein are for illustrative purposes only of selected embodiments and not all possible implementations thereof such that the drawings are not intended to limit the scope of the present disclosure.

FIG. 3 is a cross-sectional, partial side view of the example embodiment of a one-speed transfer case;

FIG. 4 is a top view of an actuator assembly of the example embodiment of a one-speed transfer case;

FIG. 5 is a magnified view of a worm gear and a spur gear of the actuator assembly of FIG. 4;

Corresponding reference numerals indicate corresponding parts throughout the several views of the drawings.

DETAILED DESCRIPTION

The disclosures of U.S. Patent Application Publication No. US 2010/0089199 to Magna Powertrain AG & CO KG and U.S. Pat. No. 7,694,598 to Magna Powertrain AG & CO KG are incorporated herein by reference in their entirety.

Figure 1:
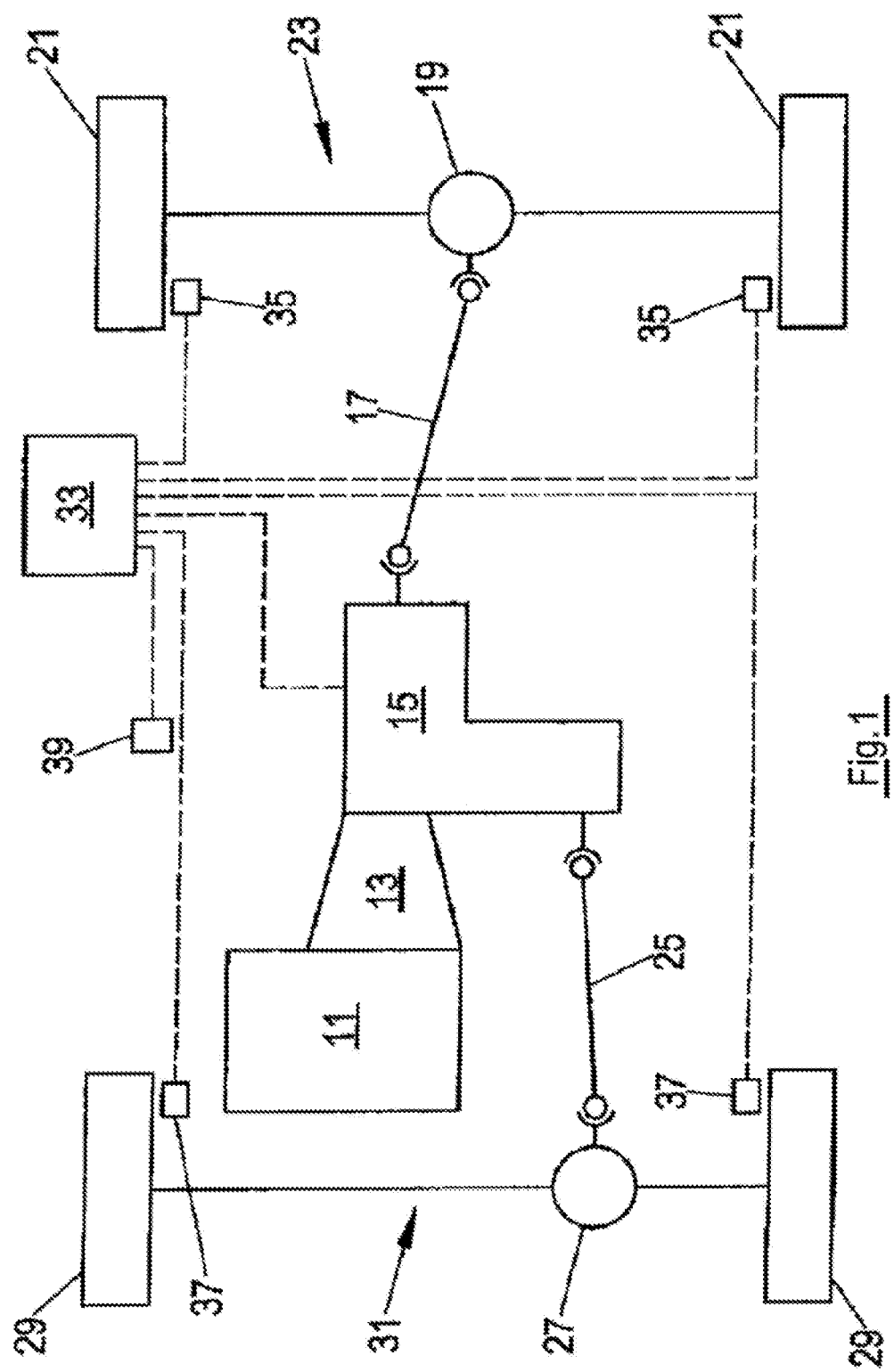
FIG. 1 is a schematic view of an example powertrain of a motor vehicle.

FIG. 1 schematically shows a powertrain of a motor vehicle having an all-wheel drive, which can be engaged. Drive torque generated by a combustion engine 11 is supplied via a main transmission 13 (manual shift transmission or automatic transmission) to a one-speed transfer case assembly 15. A first output of the transfer case assembly 15 is coupled via a Cardan shaft 17 to a rear axle differential transmission 19. Wheels 21 of a rear axle 23 are hereby permanently driven. The rear axle 23 thus forms the primary axle of the vehicle. A second output of the transfer case assembly 15 is coupled via a Cardan shaft 25 to a front axle differential transmission 27. A portion of the drive torque of the combustion engine 11 can hereby selectively be transferred to wheels 29 of a front axle 31. The front axle 31 thus forms the secondary axle of the vehicle.

Furthermore, a control system 33 for driving dynamics is shown in FIG. 1. It is connected to wheel speed sensors 35, 37 which are associated with the wheels 21 of the rear axle 23 or with the wheels 29 of the front axle 31. The control system 33 for the driving dynamics is also still connected to further sensors 39, for example to a yaw rate sensor. Depending on signals from the sensors 35, 37, 39, the control system 33 for the driving dynamics generates a control signal which is supplied to the transfer case 15 to set a specific distribution of the drive torque between the two axles 23, 31 of the vehicle. The named control signal is in particular a desired value of a clutch torque, i.e. a torque request for a clutch unit of the transfer case assembly 15.

Figure 2:
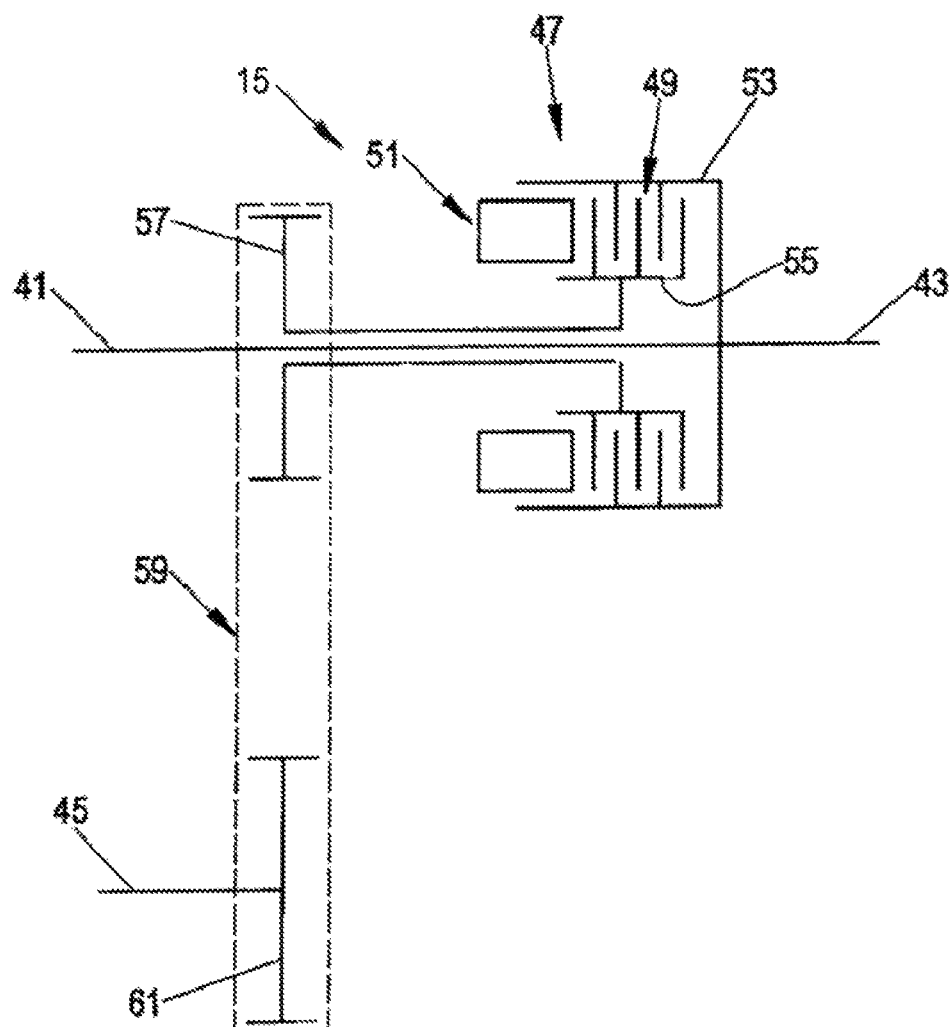
FIG. 2 is a schematic view of an example embodiment of a one-speed transfer case.

FIG. 2 shows a schematic cross-sectional view of the transfer case assembly 15 in accordance with FIG. 1. The transfer case assembly 15 has an input shaft 41, a first output shaft 43 and a second output shaft 45. The first output shaft 43 is coaxial to the input shaft 41 is made rotationally fixedly—preferably in one piece—therewith. The second output shaft 45 is arranged offset in parallel to the input shaft 41.

The transfer case assembly 15 has a mode clutch 47 having a friction clutch 49 and an actuator assembly 51. The friction clutch 49 has a clutch basket 53 which is rotationally fixedly connected to the input shaft 51 and to the first output shaft 43 and bears a plurality of clutch disks. The friction clutch 49 furthermore has a rotatably journaled clutch hub 55 which likewise bears a plurality of clutch disks which engage in an alternating arrangement into the disks of the clutch basket 53. The clutch hub 55 is rotationally fixedly connected to a drive gear 57 of a chain drive 59. An output gear 61 of the chain drive 59 is rotationally fixedly connected to the second output shaft 45. Instead of the chain drive 59, a gear drive can be provided, for example having an idler gear between the named gears 57, 61.

By actuating the actuator assembly 51 in the engagement sense of the friction clutch 49, an increasing portion of the drive torque introduced into the transfer case assembly via the input shaft 41 can be transferred to the second output shaft 45.

FIG. 3 shows in a cross-sectional view parts of the transfer case assembly 15, in accordance with FIG. 2 in further details. The friction clutch 49 is seated with the clutch basket 53 and the clutch hub 55 inside a housing 71. The clutch hub 55 is rotationally fixedly coupled to the input shaft 41 which is formed in one piece with the first output shaft 43. The clutch hub 55 can be connected by friction locking via the clutch disks 73 to the clutch basket 53 which is rotatably journaled about the axis A of the input shaft 41 or of the friction clutch 49. The clutch basket 53 is coupled via the drive gear 57 (and in this example via an idler gear instead of a chain drive) to the second output shaft (not shown in FIG. 3). The friction locking for the transfer of a torque between the clutch hub 55 and the clutch basket 53 is effected by means of a pressure plate 75 which is axially displaceable against the bias of a plate spring arrangement 77 and hereby presses the respective clutch disks 73 of the clutch hub 55 and of the clutch basket 53 toward one another.

To be able to displace the pressure plate 75 selectively against the bias and to be able hereby to actuate the friction clutch 49, a support ring 79 and an adjustment ring 81 are provided which are arranged coaxially with respect to one another and to the axis A. The adjustment ring 81 forms a rotatable first actuator assembly ring and the support ring 79 forms a rotationally fixed second actuator assembly ring. The support ring 79 is held rotationally fixedly with respect to the housing 71 by means of a fixing device not shown in FIG. 3. In this respect, the support ring 79 is supported by means of a radial bearing 83 and by means of an axial bearing 85 at the input shaft 41 or at a flange section 87 of the input shaft 41. The adjustment ring 81 is rotatably and axially displaceably journaled and it cooperates by means of an axial bearing 89 with the pressure plate 75.

The support ring 79 and the adjustment ring 81 each have a plurality of ball grooves 91 and 93 respectively at the sides facing one another. They extend along a respective peripheral direction with respect to the axis A. A respective ball groove 91 of the support ring 79 and a ball groove 93 of the adjustment ring 81 stand opposite one another and hereby surround a respective ball 95. The ball grooves 91, 93 are inclined with respect to a normal plane of the axis A, i.e. the ball grooves 91, 93 have a varying depth along the named peripheral course. It is hereby achieved that a rotary movement of the adjustment ring 81 relative to the support ring 79 held rotationally fixedly results in an axial displacement of the adjustment ring 81. A rotary movement of the adjustment ring 81 thus has the effect that the pressure plate 75 is axially displaced and the friction clutch 49 is hereby actuated. The bias effected by the plate spring arrangement 77 in this respect ensures that the respective ball 95 remains captured in the associated ball grooves 91, 93 in every rotational position of the adjustment ring 81 relative to the support ring 79.

To be able to bring about the explained rotary movement of the adjustment ring 81, it is drive-operationally coupled to an actuator assembly 160 including an electric motor 103 with an output drive 108 and a reduction gear unit 101. This is shown in the plan view in accordance with FIG. 4.

In accordance with FIG. 4, the reduction gear unit 101 is formed by a worm gear 105 which meshes with a spur gear 107. The worm gear 105 is rotationally fixedly coupled with an output drive 108 of the electric motor 103. The spur gear 107 is made in one piece with the adjustment ring 81.

FIGS. 6-10 present a further embodiment of a power transfer assembly in accordance with another aspect of the disclosure. More particularly, FIGS. 6-10 present a two-speed transfer case assembly 15'. As will be further detailed, the transfer case assembly 15' is equipped with a two-speed range clutch 40', a mode clutch 47' and an actuator assembly 51' that is operable to control coordinated shifting of range clutch 40' and adaptive engagement of mode clutch 47'. In addition, a control system 33' is provided for controlling actuation of actuator assembly 51'.

Transfer case assembly 15' is shown to include an input shaft 51' that is adapted to be coupled for driven connection with an output shaft of a transmission. Input shaft 51' is supported in a housing 71' by a bearing assembly 58' for rotation about a first rotary axis. First output shaft 43' is supported between input shaft 51' and housing 71' for rotation about the first rotary axis via a pair of laterally-spaced bearing assemblies 60' and 62'. In addition, second output shaft 45' is supported in housing 71' for rotation about a second rotary axis by a pair of bearing assemblies 64' and 66'.

Figure 6:
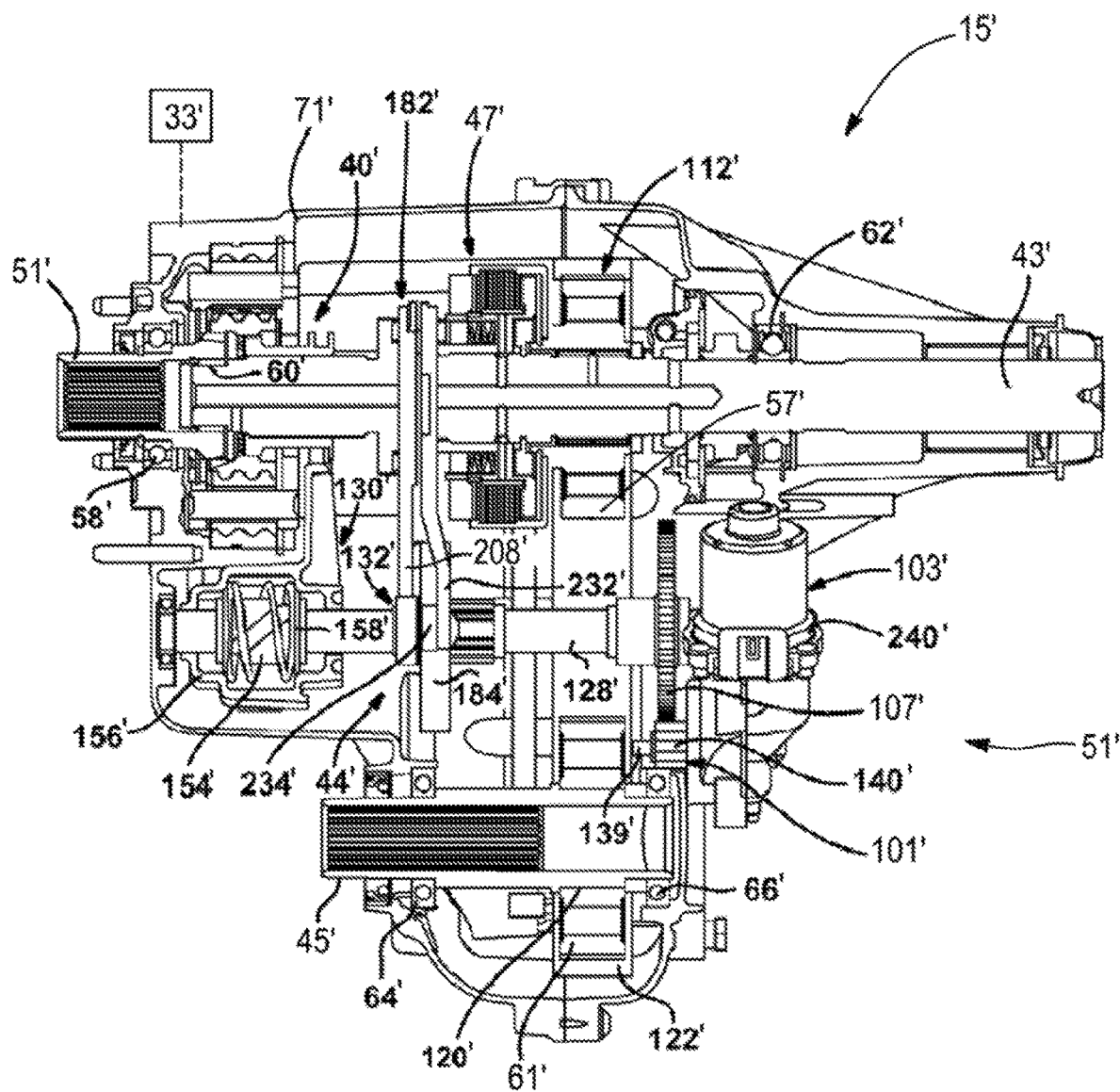
FIG. 6 is a cross-sectional, partial side view of a first example embodiment of a two-speed transfer case.
Figure 7:
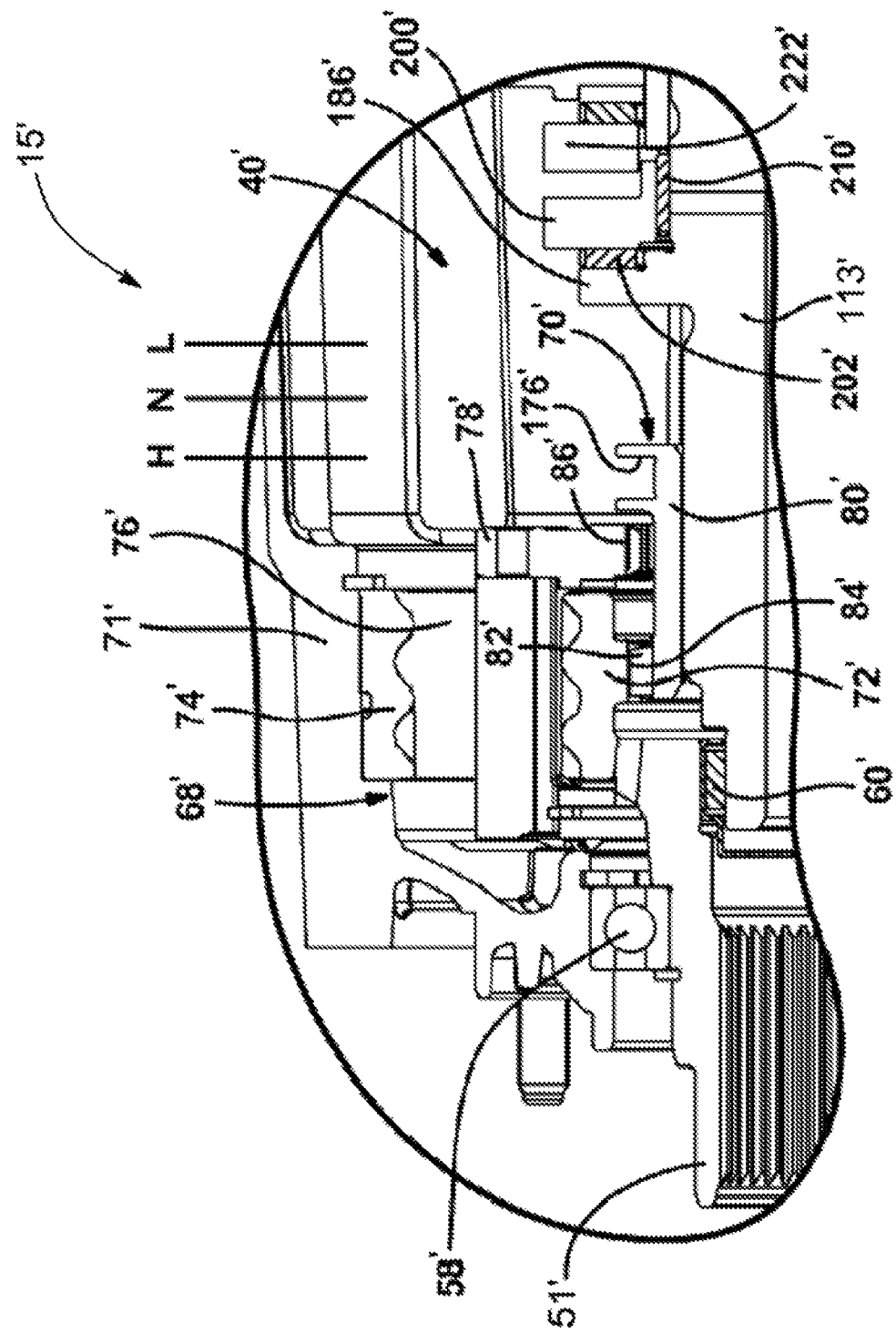
FIG. 7 is a magnified side view of a range clutch of the first example embodiment of a two-speed transfer case of FIG. 6.

As best seen from FIGS. 6-7, range clutch 40' is shown to generally include a planetary gearset 68' and a dog clutch 70'. Planetary gearset 68' has a sun gear 72' driven by input shaft 51', a ring gear 74' non-rotatably fixed to housing 71' and a plurality of planet gears 76' rotatably supported from a planet carrier 78'. As seen, planet gears 76' are meshed with both sun gear 72' and ring gear 74'. Planetary gearset 68' functions to drive planet carrier 78' at a reduced speed relative to input shaft 51'. Dog clutch 70' includes a shift collar 80' coupled via a spline connection for rotation with and axial sliding movement on first output shaft 43'. Shift collar 80' has external clutch teeth 82' adapted to selectively engage either internal clutch teeth 84' formed on input shaft 51' or internal clutch teeth 86' formed on a carrier ring associated with planet carrier 78'. Shift collar 80' is shown located in a high (H) range position such that its clutch teeth 82' are engaged with clutch teeth 84' on input shaft 51'. As such, a direct speed ratio or "high-range" drive connection is established between input shaft 51' and first output shaft 43'. Shift collar 80' is axially moveable on first output shaft 43' from its H range position through a central neutral (N) position into a low (L) range position. Location of shift collar 80' in its N position functions to disengage its clutch teeth 82' from both input shaft clutch teeth 84' and carrier clutch teeth 86', thereby uncoupling first output shaft 43' from driven connection with input shaft 51'. In contrast, movement of shift collar 80' into its L range position causes its clutch teeth 82' to engage clutch teeth 86' on planet carrier 78', thereby establishing a reduced speed ratio or "low-range" drive connection between input shaft 51' and first output shaft 43'.

It will be appreciated that planetary gearset 68' and non-synchronized dog clutch 70' function to provide transfer case assembly 15' with a two-speed (i.e., high-range and low-range) feature. However, the non-synchronized range shift unit disclosed could be easily replaced with a synchronized range shift system to permit "on-the-move" range shifting between the high-range and low-range drive modes without the need to stop the motor vehicle. Furthermore, any two-speed reduction unit having a shift member axially moveable to establish first and second drive connections between input shaft 51' and first output shaft 43' is considered to be within the scope of this invention.

Figure 8:
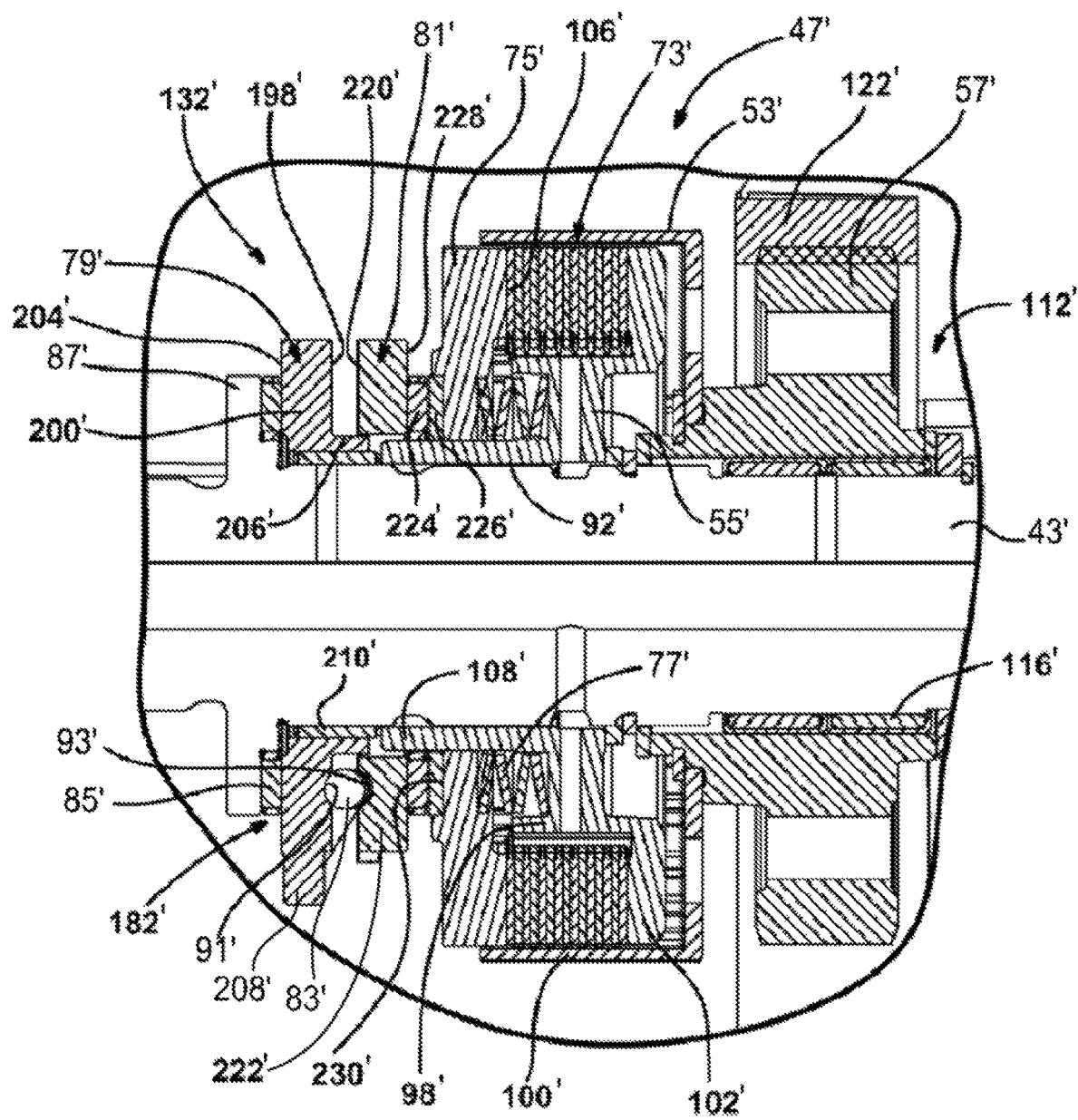
FIG. 8 is a magnified side view of a mode clutch of the first example embodiment of a two-speed transfer case of FIG. 6.
Figure 9:
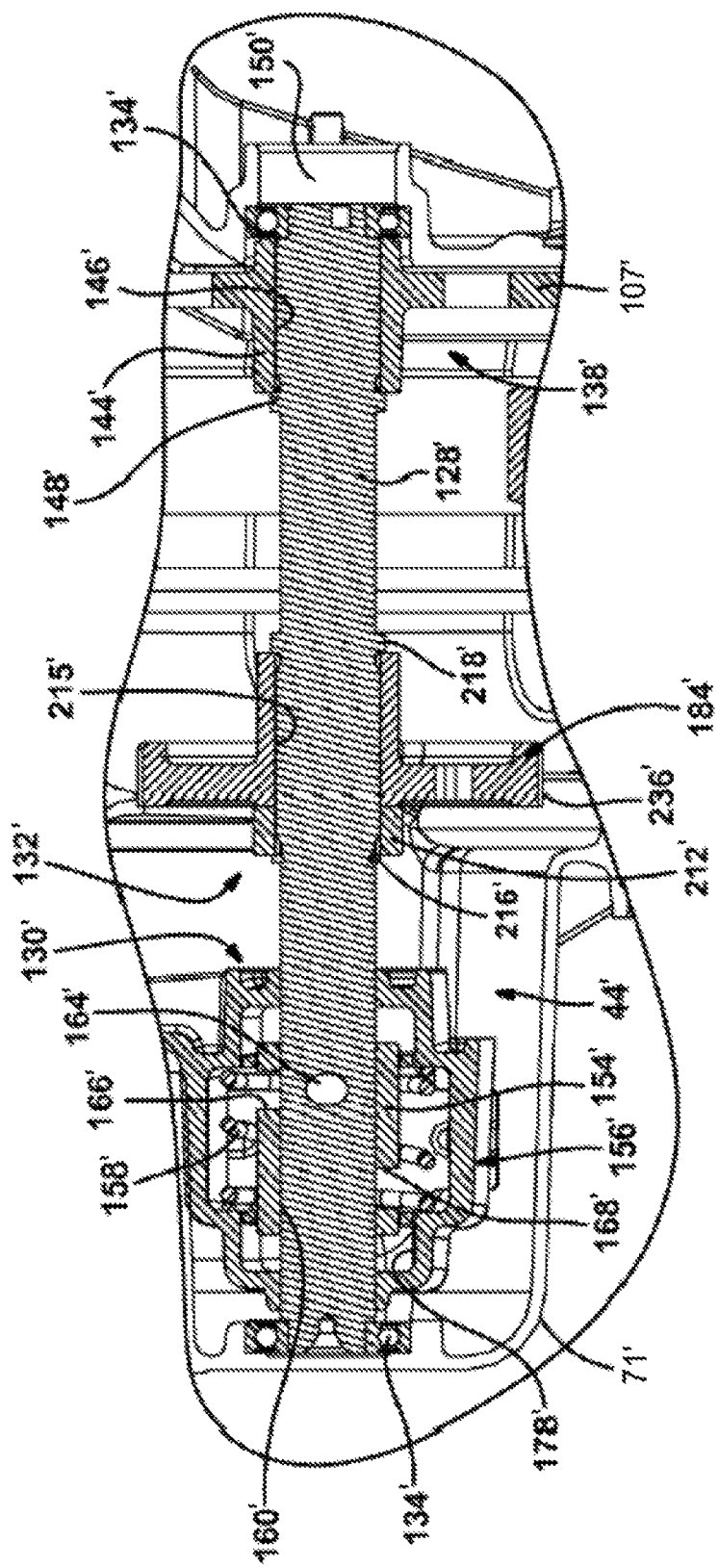
FIG. 9 is a magnified side view of an actuator assembly shaft and associated components of the first example embodiment of a two-speed transfer case of FIG. 6.
Figure 10:
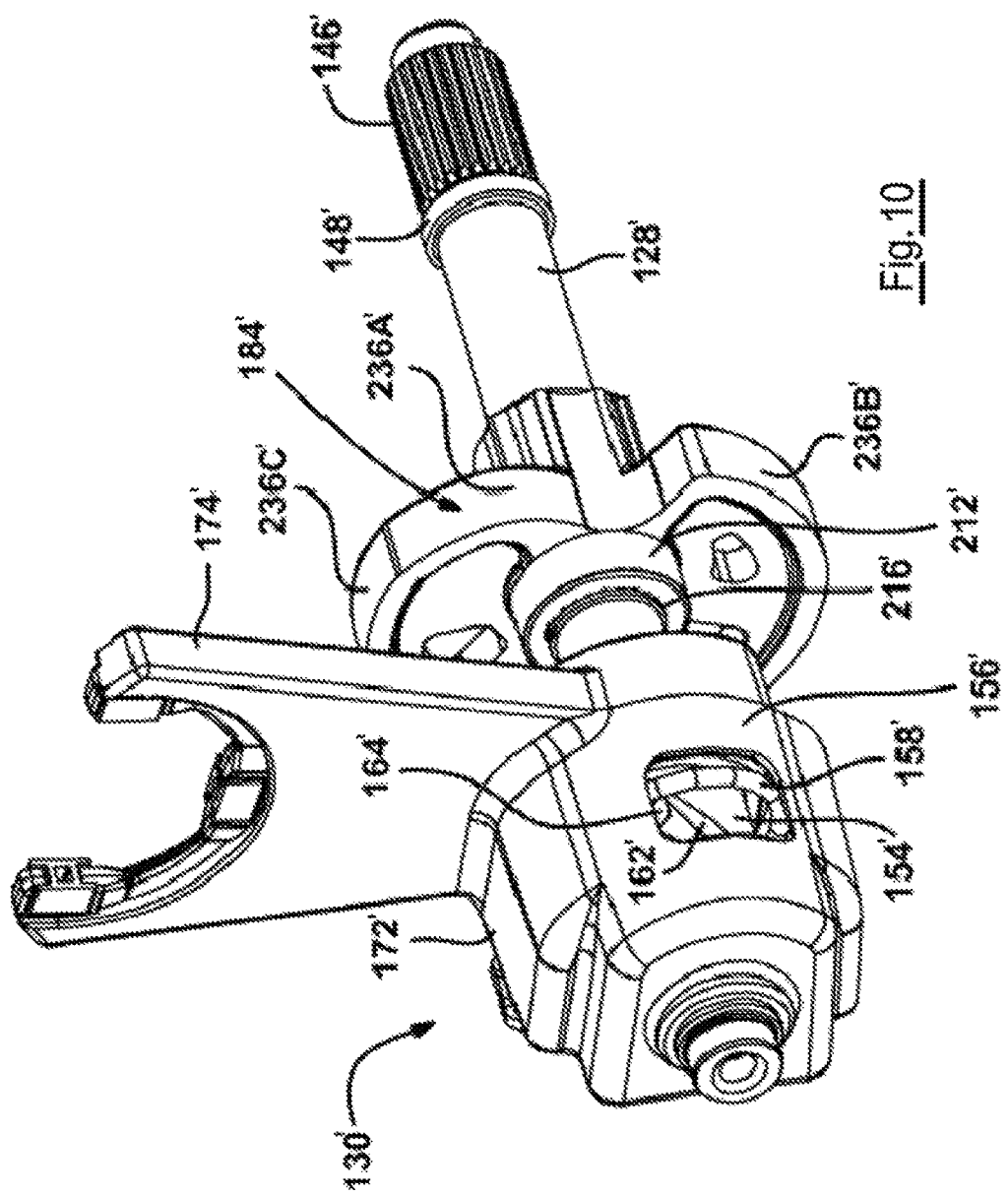
FIG. 10 is a perspective view of the actuator assembly shaft and associated components of the first example embodiment of a two-speed transfer case of FIG. 6.

Referring primarily to FIG. 8, mode clutch 47' is shown to include a clutch hub 55' fixed via a spline connection 92' for rotation with first output shaft 43', a clutch basket 53' and a multi-plate clutch disks 73' operably disposed between hub 55' and clutch basket 53'. As seen, clutch disks 73' includes a set of inner clutch plates splined to a cylindrical rim segment 98' of clutch hub 55' and which are alternately interleaved with a set of outer clutch plates splined to a cylindrical rim segment 100' of clutch basket 53'. Clutch disks 73' are retained for limited sliding movement between a reaction plate segment 102' of clutch hub 55' and a pressure plate 75'. Pressure plate 75' has a face surface 106' adapted to engage and apply a compressive clutch engagement force on clutch disks 73'. Pressure plate 75' is splined to rim segment 98' for common rotation with clutch hub 55' and is further supported for sliding movement on a tubular sleeve segment 108' of clutch hub 55'. A spring arrangement 77' is provided between hub 55' and pressure plate 75' for normally biasing pressure plate 75' away from engagement with clutch disks 73'.

Upon engagement of mode clutch 47', drive torque is transmitted from first output shaft 43' through clutch disks 73' and a transfer assembly 112' to second output shaft 45'. Transfer assembly 112' includes a drive gear 57' rotatably supported on first output shaft 43', an output gear 61' fixed via a spline connection 120' to second output shaft 45' and a power chain 122' encircling drive and output gears 57', 61'. Clutch basket 53' is fixed for rotation with drive gear 57' such that drive torque transferred through clutch disks 73' is transmitted through transfer assembly 112' to second output shaft 45'.

Pressure plate 75' is axially moveable relative to clutch disks 73' between a first or "released" position and a second or "locked" position. With pressure plate 75' in its released position, a minimum clutch engagement force is exerted on clutch disks 73' such that virtually no drive torque is transferred through mode clutch 47' so as to establish a two-wheel drive mode. Spring arrangement 77' is arranged to normally urge pressure plate 75' toward its released position. In contrast, location of pressure plate 75' in its locked position causes a maximum clutch engagement force to be applied to clutch disks 73' such that second output shaft 45' is, in effect, coupled for common rotation with first output shaft 43' so as to establish a locked or "part-time" four-wheel drive mode. Therefore, accurate control of the position of pressure plate 75' between its released and locked positions permits adaptive regulation of the torque transfer between first output shaft 43' and second output shaft 45', thereby permitting establishment of an adaptive or "on-demand" four-wheel drive mode.

As best shown in FIGS. 6-10, actuator assembly 51' is operable to coordinate movement of shift collar 80' between its three distinct range positions with movement of pressure plate 75' between its released and locked positions. In its most basic form, actuator assembly 51' includes an electric motor 103', an actuator assembly shaft 128' driven by electric motor 103', a range actuator assembly 130' and a mode actuator assembly 132'. Actuator assembly shaft 128' has its opposite ends supported by a pair of laterally-spaced bearing assemblies 134' for rotation in housing 71' about a third rotary axis. A reduction gear unit 101' provides a drive connection between a rotary output of electric motor 103' and actuator assembly shaft 128'. Reduction gear unit 101' includes a worm gear (not shown, contained within a housing of motor 103') (arranged like worm gears 105", 105''' shown in FIGS. 11-14) that is driven by a rotary output of electric motor 103', a spur gear 107' and a drive gear 140. Actuation of electric motor 103' causes the worm gear to drive the drive gear 140' associated with spur gear 107'. Specifically, drive gear 140' is a small diameter spur gear supported for rotation on an idler shaft 139' and which is meshed with larger diameter driven spur gear 107' fixed for rotation with actuation shaft 128'. The worm gear could alternatively be directly meshed with the spur gear 107', like the arrangements presented in FIGS. 11-14. Driven spur gear 107' includes a tubular hub segment 144' that is fixed via a spline connection 146' to actuator assembly shaft 128' between a radial shaft flange 148' and rear bearing assembly 134'. The cumulative reduction ratio provided by reduction gear unit 101' permits the use of a small, low power electric motor 103'. An angular position sensor or encoder 150' is mounted to an end portion of actuator assembly shaft 128' for providing the control unit 33' with an input signal indicative of the angular position of actuator assembly shaft 128'.

Range actuator assembly 130' is operable to convert bidirectional rotary motion of actuator assembly shaft 128' into bidirectional translational movement of shift collar 80' between its three distinct range positions. Range actuator assembly 130' is shown to generally include a range cam 154', a range fork 156' and a spring-biasing unit 158'. Range cam 154' is a tubular member having an inner diameter surface 160' journalled for sliding movement on actuator assembly shaft 128'. An elongated shift slot 162' is formed in range cam 154' and receives a follower pin 164' that is fixed for rotation with actuator assembly shaft 128'. Slot 162' includes a high-range dwell segment 166', a low-range dwell segment 168' and a helical shift segment 170' interconnecting dwell segments 166' and 168'. Range fork 156' includes a sleeve segment 172' supported for sliding movement on actuator assembly shaft 128' and a fork segment 174' which extends from sleeve segment 172' into an annular groove 176' formed in shift collar 80'. Sleeve segment 172' defines an interior chamber 178' within which range cam 154' and spring-biasing unit 158' are located. Spring-biasing unit 158' is operably disposed between range cam 154' and sleeve segment 172' of range fork 156'. Spring-biasing unit 158' functions to urge range fork 156' to move axially in response to axial movement of range cam 154' while its spring compliance accommodates tooth "block" conditions that can occur between shift collar clutch teeth 82' and input shaft clutch teeth 84' or carrier clutch teeth 86'. As such, spring-biasing unit 158' assures that range fork 156' will complete axial movement of shift collar 80' into its H and L range positions upon elimination of any such tooth block condition.

As best shown in FIGS. 6-7 and 9-10, range actuator assembly 130' is arranged such that axial movement of range cam 154' results from movement of follower pin 164' within shift segment 170' of slot 162' in response to rotation of actuator assembly shaft 128'. As noted, such movement of range cam 154' causes range fork 156' to move shift collar 80' between its three distinct range positions. Specifically, when it is desired to shift range clutch 40' into its high-range drive mode, electric motor 103' rotates actuator assembly shaft 128' in a first direction which, in turn, causes concurrent rotation of follower pin 164'. Such rotation causes follower pin 164' to move within shift segment 170' of slot 162' for axially moving range cam 154' and range fork 156' until shift collar 80' is located in its H range position. With shift collar 80' in its H range position, the high-range drive connection is established between input shaft 51' and first output shaft 43'. Continued rotation of actuator assembly shaft 128' in the first direction causes follower pin 164' to exit shift segment 170' of shift slot 162' and enter high-range dwell segment 166' for preventing further axial movement of range cam 154', thereby maintaining shift collar 80' in its H range position. The length of high-range dwell segment 166' of shift slot 162' is selected to permit sufficient additional rotation of actuator assembly shaft 128' in the first rotary direction to accommodate actuation of mode clutch 47' by mode actuator assembly 132'.

With shift collar 80' in its H range position, subsequent rotation of actuator assembly shaft 128' in the opposite or second direction causes follower pin 164' to exit high-range dwell segment 166' and re-enter helical shift segment 170' of range cam slot 162' for causing range cam 154' to begin moving shift collar 80' from its H range position toward its L range position. Upon continued rotation of actuator assembly shaft 128' in the second direction, follower pin 164' exits shift segment 170' of range cam slot 162' and enters low-range dwell segment 168' for locating and maintaining shift collar 80' in its L range position, whereby the low-range drive connection between planet carrier 78' and first output shaft 43' is established. Again, the length of low-range dwell segment 168' of shift slot 162' is selected to permit additional rotation of actuator assembly shaft 128' in the second rotary direction required to accommodate complete actuation of mode clutch 47'.

As best shown in FIGS. 6 and 8-10, mode actuator assembly 132' is operable to convert bi-directional rotary motion of actuator assembly shaft 128' into bidirectional translational movement of pressure plate 75' between its released and locked positions so as to permit adaptive regulation of the drive torque transferred through mode clutch 47' to second output shaft 45'. In general, mode actuator assembly 132' includes a ballramp unit 182' and a mode cam 184'. Ballramp unit 182' is supported on first output shaft 43' between a flange section 87' and pressure plate 75'. Ballramp unit 182' includes a support ring 79', an adjustment ring 81' and radial bearings 83' disposed in aligned sets of tapered ball grooves 91' and 93' formed in corresponding face surfaces of support and adjustment rings 79' and 81'. As seen, a axial bearing 85' is disposed between radial flange 87' and a second face surface 204' of support ring 79'. Support ring 79' further includes a tubular sleeve segment 206' and an elongated lever segment 208'. Sleeve segment 206' is supported on first output shaft 43' via a bearing assembly 210'. Lever segment 208' has a terminal end portion engaging a spacer collar 212' that is piloted on an and able to rotate relative to actuator assembly shaft 128'. Mode cam 184' is fixed via a spline connection 215' for common rotation with actuator assembly shaft 128'. A lock ring 216' axially locates spacer collar 212' and mode cam 184' relative to a radial shaft flange 218'.

Adjustment ring 81' of ball ramp unit 182' has its grooves 93' formed in a first face surface 220' of a cam ring segment 222' that is shown to generally surround portions of sleeve segment 206' of support ring 79' and sleeve segment 108' of clutch hub 55'. A thrust bearing assembly 224' and thrust ring 226' are disposed between a second face surface 228' of cam ring segment 222' and a face surface 230 of pressure plate 75'. Adjustment ring 81' further includes an elongated lever segment 232' having a mode follower 234' mounted at its terminal end that rollingly engages a cam surface 236' formed on an outer peripheral edge of mode cam 184'. As will be detailed, the contour of cam surface 236' on mode cam 184' functions to control angular movement of adjustment ring 81' relative to support ring 79' in response to rotation of actuation shaft 128'. Such relative angular movement between cam members 188' and 190' causes radial bearings 83' to travel along tapered ball grooves 91' and 93' which, in turn, causes axial movement of adjustment ring 81'. Such axial movement of adjustment ring 81' functions to cause corresponding axial movement of pressure plate 75' between its released and locked positions, thereby controlling the magnitude of the clutch engagement force applied to clutch disks 73'.

As seen, lever segment 232' of adjustment ring 81' is located on one side of actuator assembly shaft 128' while lever segment 208' of support ring 79' is located on the opposite side of actuator assembly shaft 128'. Due to engagement of mode follower 234' with cam surface 236' on mode cam 184', adjustment ring 81' is angularly moveable relative to support ring 79' between a first or "retracted" position and a second or "extended" position in response to rotation of actuator assembly shaft 128'. With adjustment ring 81' rotated to its retracted position, spring arrangement 77' biases pressure plate 75' to its released position which, in turn, urges radial bearings 83' to be located in deep end portions of aligned ball grooves 91' and 93'. Thus, such movement of adjustment ring 81' to its angularly retracted position relative to support ring 79' also functions to locate adjustment ring 81' in an axially retracted position relative to clutch disks 73'. While not shown, a biasing unit may be provided between lever segments 208' and 232' to assist spring arrangement 77' in normally urging adjustment ring 81' toward its retracted position. In contrast, angular movement of adjustment ring 81' to its extended position causes radial bearings 83' to be located in shallow end portions of aligned ball grooves 91' and 93' which causes axial movement of adjustment ring 81' to an axially extended position relative to clutch disks 73'. Such axial movement of adjustment ring 81' causes pressure plate 75' to be moved to its locked position in opposition to the biasing exerted thereon by spring arrangement 77'. Accordingly, control of angular movement of adjustment ring 81' between its retracted and extended positions functions to control concurrent movement of pressure plate 75' between its released and locked positions.

As previously noted, cam surface 236' of mode cam 184' and shift slot 162' of range cam 154' are configured to coordinate movement of shift collar 80' and pressure plate 75' in response to rotation of actuator assembly shaft 128' for establishing a plurality of different drive modes. According to one possible control arrangement, mode selector 50' could permit the vehicle operator to select from a number of different two-wheel and four-wheel drive modes including, for example, a two-wheel high-range drive mode, an on-demand four-wheel high-range drive mode, a part-time four-wheel high-range drive mode, a Neutral mode and a part-time four-wheel low-range drive mode. Specifically, control system 46 functions to control the rotated position of actuator assembly shaft 128' in response to the mode signal delivered to ECU 52' by mode selector 50' and the sensor input signals sent by sensors 48' to ECU 52'.

Figure 11:
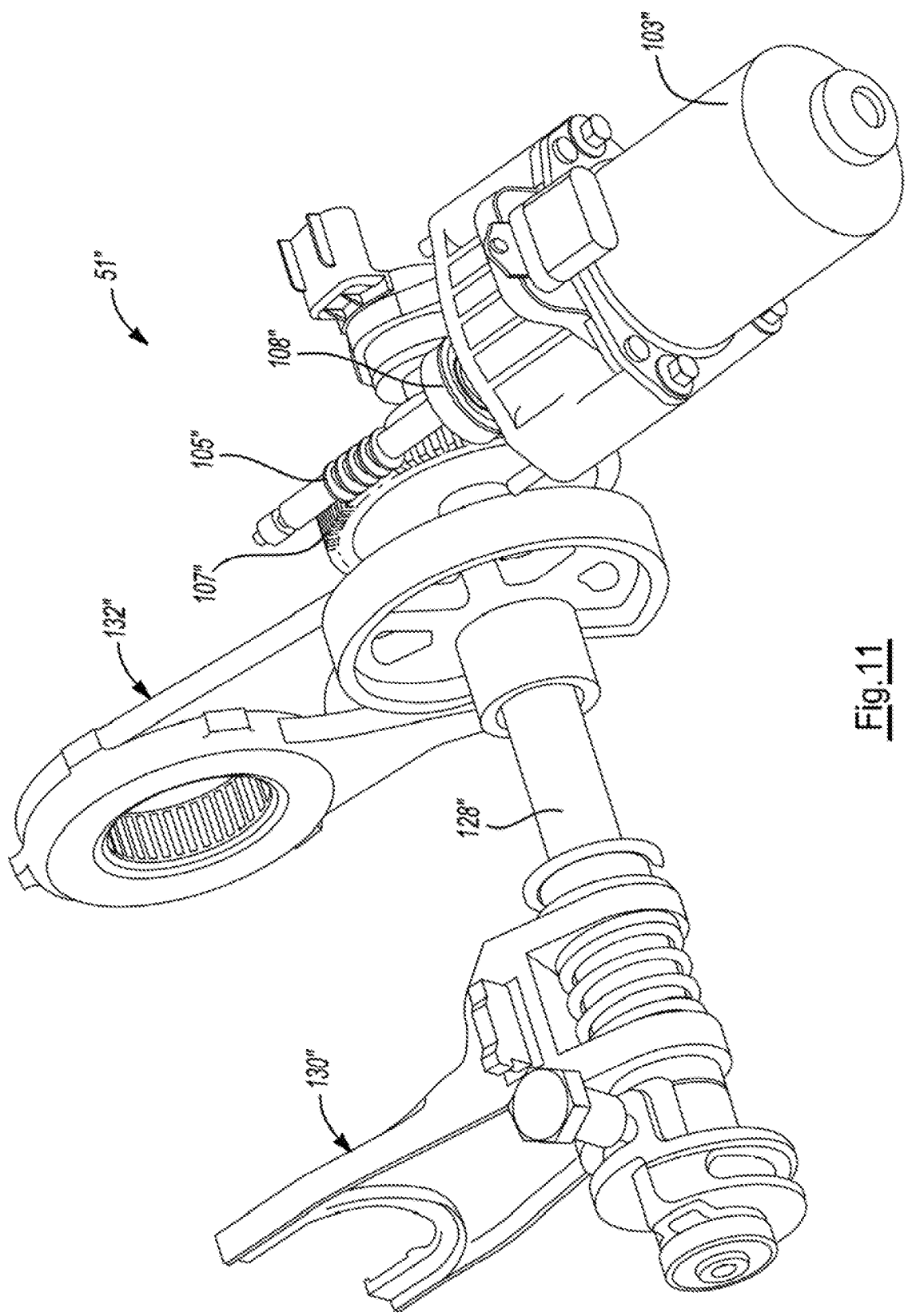
FIG. 11 is a perspective view of a second example embodiment of an actuator assembly for a two-speed transfer case.

A further example embodiment of an actuator assembly 51" of a two-speed transfer case is presented in FIG. 11. According to this embodiment, the actuator assembly 51" includes an electric motor 103" with an output drive 108" that is coupled with a worm gear 105". The worm gear 105" is meshed directly with a spur gear 107" (with no intermediate gears) that is fixed about an actuator assembly shaft 128". A range actuator assembly 130" and a mode actuator assembly 132" are activated in response to rotation of the actuator assembly shaft 128".

Figure 12:
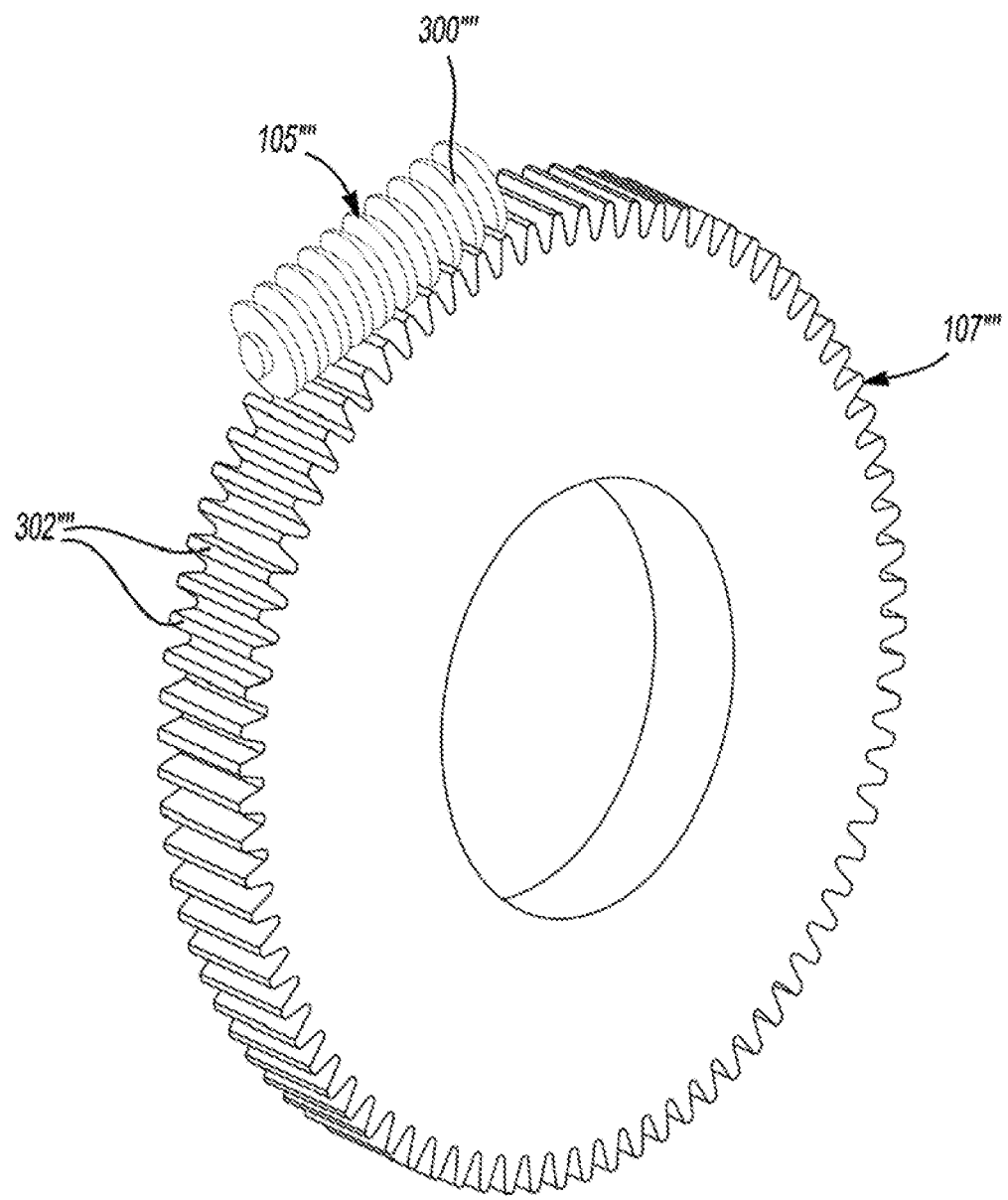
FIG. 12 is a perspective view of example embodiments of improved worm and spur gears of an actuator of a torque transfer device.
Figure 14:
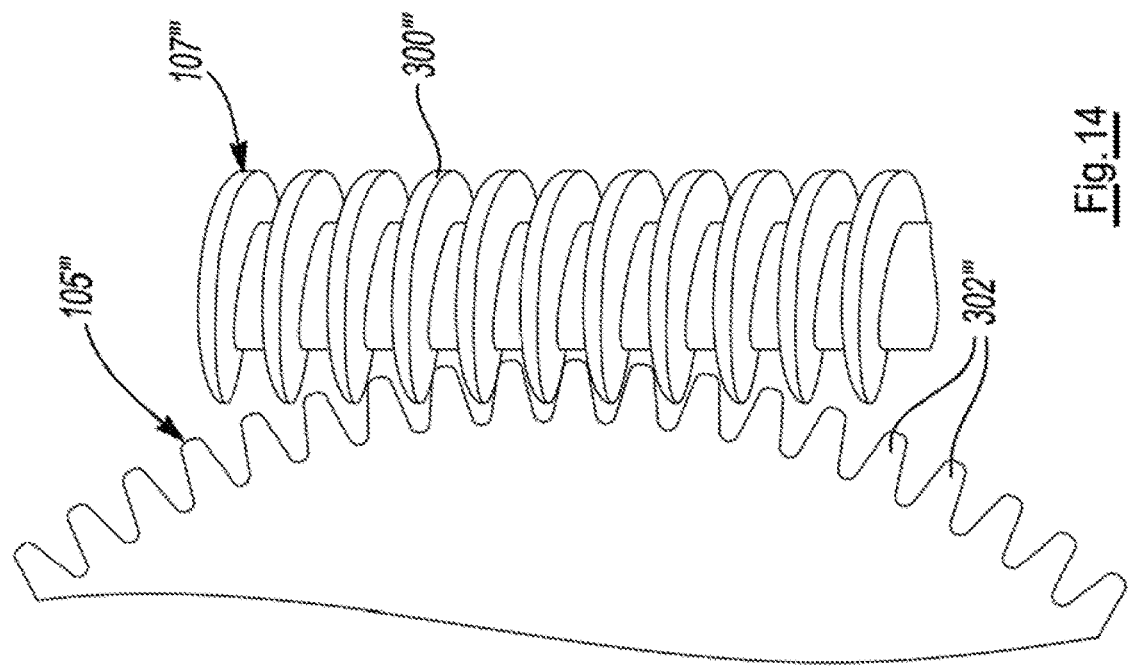
FIG. 14 is a side perspective view of the worm and spur gears of FIG. 12.
Figure 13:
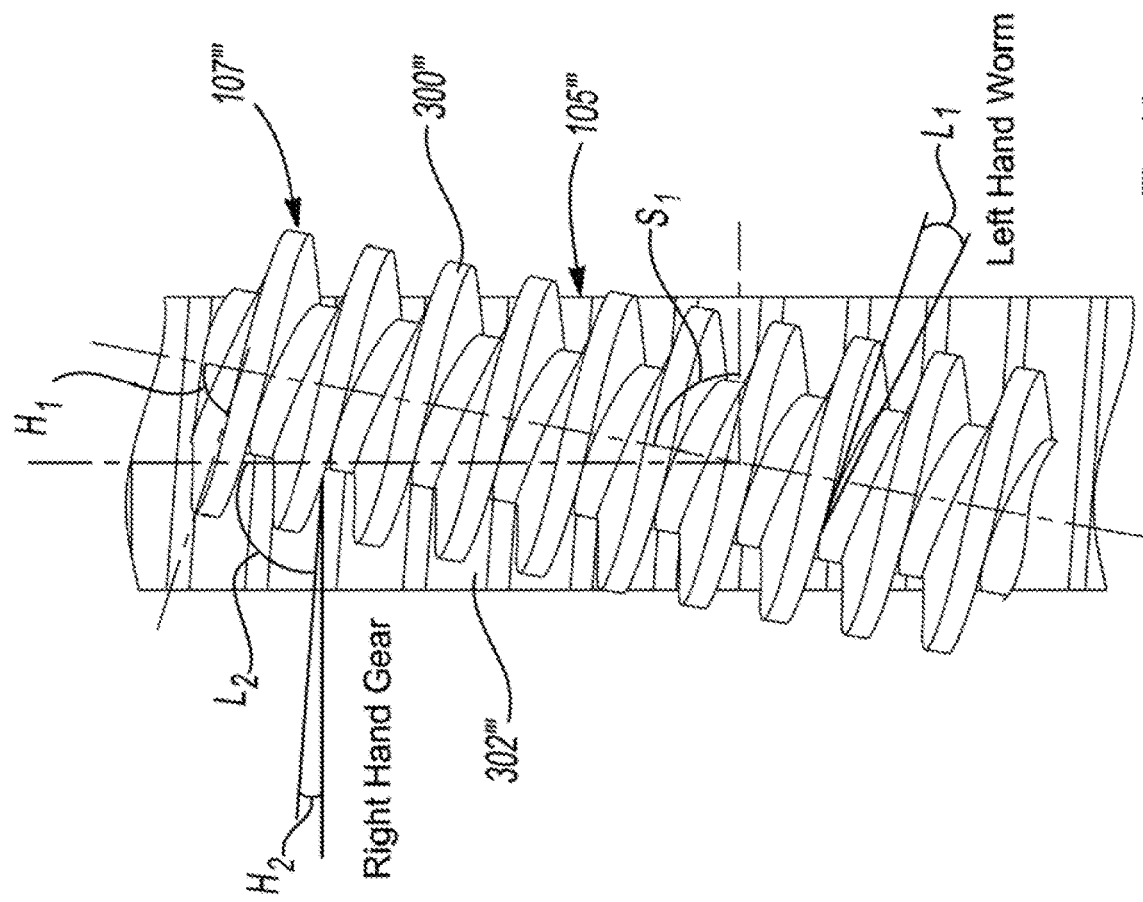
FIG. 13 is a magnified top view of the worm and spur gears of FIG. 12.

An embodiment of a worm gear 105''' and spur gear 107''' that may be employed in conjunction with any of the aforementioned actuator assemblies 51, 51', 51", or other power transfer assemblies, is shown in FIGS. 12-14. According to this embodiment, the worm gear 105''' and spur gear 107''' are arranged such that the actuator assembly self-locks. More particularly, the worm and spur gears 105''', 107''' are arranged such that the spur gear 107''' is unable to drive the worm gear 105''', and thus all movement provided by the actuator assembly is initiated by the worm gear 105'''/motor (not the spur gear 107"). This capability is provided because a coefficient of friction between teeth 302''' of the spur gear 107''' and a tooth 300''' of the worm gear 105''' is larger than a tangent of a lead angle L1 of the worm gear's tooth 300". The arrangement of FIGS. 12-14 also has a specific combination of a shaft axis angle S1 and lead and helix angles L1, L2, H1, H2 of the worm and spur gears 105''', 107''' that allows the worm and spur gears 105''', 107''' to have opposite hands while also providing a suitable mesh between the teeth 300''', 302''' of the worm and spur gears 105''', 107''' to provide improved operation of the actuator assembly. Particularly, as best presented in FIG. 13, the worm gear 105''' has one tooth 300''', and the spur gear 107''' has 110 teeth 302'''. The worm and spur gears 105''', 107'' could have other numbers of teeth 300''', 302''' without departing from the scope of the subject disclosure. A lead angle L1 of the worm gear 105''' is between approximately 3 and 6 degrees with a coefficient of friction of between approximately 0.05 and 0.10. In the example arrangement, the lead angle L1 is 5.350 degrees. A lead angle L2 of the spur gear 107''' is approximately 85 degrees, with the lead angle L2 of the example embodiment being 85.357 degrees. A helix angle H1 of the worm gear 105''' is approximately 84 degrees, with the helix angle H1 of the example arrangement being 84.650 degrees. A helix angle H2 of the spur gear 107''' is approximately 4 degrees, with the helix angle H2 of the example embodiment being 4.643 degrees. The worm gear 105''' is left handed, and the spur gear 107''' is right handed in the example arrangement, however, the worm gear 105''' could be right handed, with the spur gear 107''' being left handed without departing from the scope of the subject disclosure. A shaft axis S1 angle between the worm and spur gears 105''', 107''' is between 80 and 90 degrees, with the shaft angle S1 of the example arrangement being 80.007 degrees.

The aforementioned arrangement of the worm and spur gears 105''', 107''' maximizes an efficiency of the mesh between the teeth 300''', 302''' of the worm and spur gear 105''', 107''', which minimizes a time required to open and close the clutch and maximizes torque transmitted from the motor to the spur gear 107''. Utilizing opposite hands also provides a reduction in an angle of friction which would not be achievable with gears of the same hand, and thus improves the ability of the worm and spur gears 105''', 107''' to self-lock. Accordingly, the disclosure provides worm and spur gears 105''', 107''' with opposite hands in combination with a lead angle L1 of the worm gear 105''' being below the angle of friction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example torque transfer assemblies can likewise be implemented into many other systems.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 180 degrees or at other orientations) and the spatially relative descriptions used herein interpreted accordingly.

What is claimed is:
1. A power transfer assembly for a vehicle, comprising:
an input shaft;
at least one output shaft;
at least one clutch configured to perform at least one of
changing a gear ratio between the input shaft and the at least one output shaft, and coupling the input shaft with a second output shaft of the at least one output shaft; and an actuator assembly for activating the at least one clutch, the actuator assembly having a motor having an output drive, a worm gear coupled with the output drive, and a spur gear meshed with the worm gear and coupled with the at least one clutch for activating the at least one clutch;

wherein the worm gear and the spur gear having opposite gear hands;

wherein the worm gear extends along and is rotatable about a first axis, wherein the spur gear is disposed about and rotatable about a second axis, and wherein a shaft axis angle between the first axis of the worm gear and the second axis of the spur gear is an oblique angle.

2. The power transfer assembly of claim 1, wherein a coefficient of friction between teeth of the spur gear and a tooth of the worm gear is larger than a tangent of a lead angle of the tooth of the worm gear.

3. The power transfer assembly of claim 1, wherein a tooth of the worm gear has a lead angle of between approximately 3 and 6 degrees, and wherein each of a plurality of teeth of the spur gear have a lead angle of approximately 85 degrees.

4. The power transfer assembly of claim 3, wherein the tooth of the worm gear has a helix angle of approximately 84 degrees, and wherein each of the teeth of the spur gear has a helix angle of approximately 4 degrees.

5. A power transfer assembly for a vehicle, comprising:
an input shaft;
at least one output shaft;
at least one clutch configured to perform at least one of changing a gear ratio between the input shaft and the at least one output shaft, and coupling the input shaft with a second output shaft of the at least one output shaft; and
an actuator assembly for activating the at least one clutch, the actuator assembly having a motor having an output drive, a worm gear coupled with the output drive, and a spur gear meshed with the worm gear and coupled with the at least one clutch for activating the at least one clutch;
wherein the worm gear and the spur gear having opposite gear hands;
wherein the worm gear extends along and is rotatable about a first axis, wherein the spur gear is disposed about and rotatable about a second axis, and wherein a shaft axis angle between the first axis of the worm gear and the second axis of the spur gear is between approximately 80 and 90 degrees.

6. A power transfer assembly for a vehicle, comprising:
an input shaft;
a first output shaft and a second output shaft;
a mode clutch operable in a first mode position to disengage the second output shaft from driven engagement with the first output shaft and further operable in a second mode position to establish a drive connection between the first output shaft and the second output shaft;
an actuator assembly for moving the mode clutch between the first and said modes; and
wherein the actuator assembly includes a motor having an output drive and a reduction gear unit coupled with the output drive of the motor for providing a gear reduction between the output shaft and the mode clutch;
wherein the reduction gear unit includes a worm gear connected to the output drive of the motor and a spur gear meshed with the worm gear and coupled with the mode clutch for moving the mode clutch between the first and second positions in response to rotation of the spur gear;
wherein the worm gear and the spur gear having opposite gear hands;
wherein the worm gear extends along and is rotatable about a first axis, wherein the spur gear is disposed about and rotatable about a second axis, and wherein a shaft axis angle between the first axis of the worm gear and the second axis of the spur gear is an oblique angle.

7. The power transfer assembly of claim 6, wherein a coefficient of friction between teeth of the spur gear and a tooth of the worm gear is larger than a tangent of a lead angle of the tooth of the worm gear.

8. The power transfer assembly of claim 7, wherein the worm gear extends along and is rotatable about a first axis, wherein the spur gear is disposed about and rotatable about a second axis, and wherein a shaft axis angle between the first axis of the worm gear and the second axis of the spur gear is between approximately 80 and 90 degrees.

9. The power transfer assembly of claim 7, wherein a tooth of the worm gear has a lead angle of between approximately 3 and 6 degrees, and wherein each of a plurality of teeth of the spur gear has a lead angle of approximately 85 degrees.

10. The power transfer assembly of claim 9, wherein the tooth of the worm gear has a helix angle of approximately 84 degrees, and wherein each of the teeth of the spur gear have a helix angle of approximately 4 degrees.

11. A power transfer assembly for a vehicle, comprising:
an input shaft;
a first output shaft and a second output shaft;
a range unit driven at a reduced speed relative to the input shaft;
a range clutch operable in a first range position to establish a drive connection between the input shaft and the first output shaft and further operable in a second range position to establish a drive connection between the range clutch and the first output shaft;
a mode clutch operable in a first mode position to disengage the second output shaft from driven engagement with the first output shaft and further operable in a second mode position to establish a drive connection between the first output shaft and the second output shaft; and
an actuator assembly for moving the range clutch between the first and second range positions and for moving the mode clutch between the first and second mode positions;
wherein the actuator assembly includes a drive motor having an output, a reduction gear unit coupled with the output of the drive motor for providing a gear reduction relative to the output of the drive motor, an actuator assembly shaft coupled with the reduction gear unit, a range actuator assembly driven by the actuator assembly shaft for moving the range clutch between its first and second range positions in response to rotation of the actuator assembly shaft, and a mode actuator assembly driven by the actuator assembly shaft for moving the mode clutch between the first and second mode positions;
wherein the reduction gear unit includes a worm gear connected to the output of the drive motor and a spur gear meshed with the worm gear and coupled with the actuator assembly shaft for providing rotation of the actuator assembly shaft;

wherein the worm gear and the spur gear having opposite gear hands;

wherein the worm gear extends along and is rotatable about a first axis, wherein the spur gear is disposed about and rotatable about a second axis, and wherein a shaft axis angle between the first axis of the worm gear and the second axis of the spur gear is an oblique angle.

12. The power transfer assembly of claim 11, wherein a coefficient of friction between teeth of the spur gear and a tooth of the worm gear is larger than a tangent of a lead angle of the tooth of the worm gear.

13. The power transfer assembly of claim 11, wherein the worm gear extends along and is rotatable about a first axis, wherein the spur gear is disposed about and rotatable about a second axis, and wherein a shaft axis angle between the first axis of the worm gear and the second axis of the spur gear is between approximately 80 and 90 degrees.

14. The power transfer assembly of claim 11, wherein a tooth of the worm gear has a lead angle of between approximately 3 and 6 degrees, and wherein each of a plurality of teeth of the spur gear have a lead angle of approximately 85 degrees.

15. The power transfer assembly of claim 14, wherein the tooth of the worm gear has a helix angle of approximately 84 degrees, and wherein each of the teeth of the spur gear have a helix angle of approximately 4 degrees.

\* \* \* \* \*